O. A. MYGATT.
PRISMATIC AND DIFFUSION INCLOSURE.
APPLICATION FILED JULY 13, 1905.

935,220.

Patented Sept. 28, 1909.

WITNESSES:
Chas. K. Davies
M. E. Brown.

INVENTOR
O. A. Mygatt

BY W. H. Bartlett
His Attorney

UNITED STATES PATENT OFFICE.

OTIS A. MYGATT, OF NEW YORK, N. Y.

PRISMATIC AND DIFFUSION INCLOSURE.

935,220.  Specification of Letters Patent.  Patented Sept. 28, 1909.

Application filed July 13, 1905. Serial No. 269,551.

*To all whom it may concern:*

Be it known that I, OTIS A. MYGATT, a citizen of New York, residing at New York, in the county of New York and State of New York, have invented certain new and useful Improvements in Prismatic and Diffusion Inclosures, of which the following is a specification, reference being had therein to the accompanying drawing.

This invention relates to shades and reflectors, or shade reflectors for artificial lights.

The object of the invention is to produce a shade, reflector, or other like article having its body composed of transparent glass, and having prismatic outer surfaces by which light rays are reflected or refracted, and having an interior film or coating of translucent, but not transparent, material for softening, diffusing or blending light rays.

Figure 1:
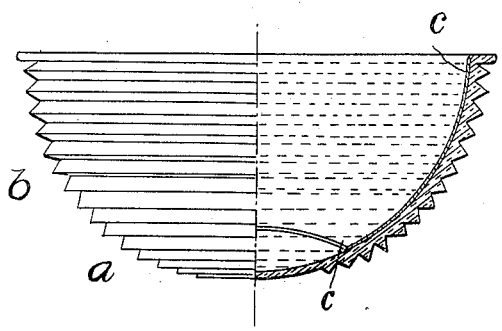
Figure 2:
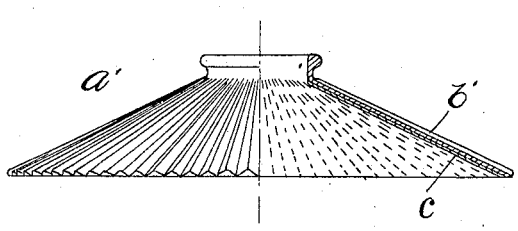
Figure 3:
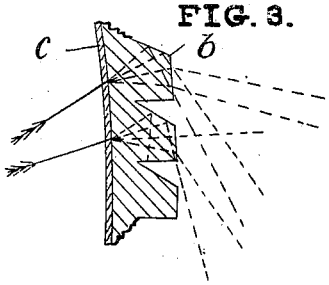
Figure 4:
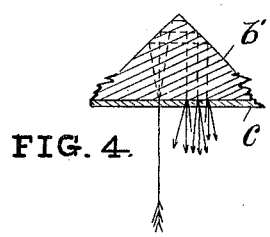
Figure 5:
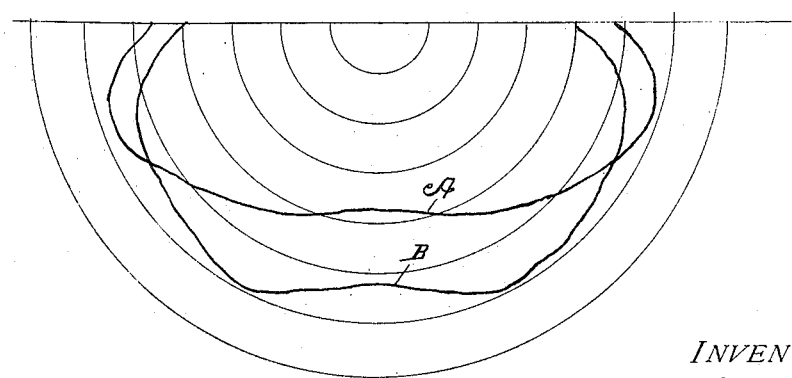

Figure 1 is a partial side elevation and partial section of a shade of well-known form, having external prisms for light distribution, but an interior coating over part at least of its surface in lieu of the usual diffusing ribs. Fig. 2 is a partial elevation and partial section of a reflector of like character. Fig. 3 is an enlarged broken section of Fig. 1, showing course of some light rays. Fig. 4 is an enlarged section of a reflecting prism, Fig. 2, showing course of some light rays. Fig. 5 is a diagram showing comparative curves of light distribution of the shade, Fig. 1, and the same form of shade provided with internal distributing ribs instead of the translucent film.

Prism glass globes and reflectors for diffusing and distributing light are old. In all cases, with one exception, so far as I know, the glass is transparent, having prisms either on the inside only, or on the outside, or on both sides of the glass. In all cases where diffusing takes place, the diffusing or softening the light is done by interior diffusing prisms, and the distribution of light by outer distributing surfaces, as in the Blondel and Psaroudaki patents, Nos. 563,836, July 14, 1896, and 593,348, November 9, 1897. The material of such prism glass as made has been invariably transparent in character (with one exception to be mentioned hereafter)

Although prism glass globes and reflectors are very efficient, and are sold in large quantities, there is in many cases objection to their sparkling or brilliant appearance. The present invention is to do away with the sparkling appearance, by using a different medium other than prismatic surfaces in combination with prismatic distributing surfaces.

My method of construction is, with both the reflectors and globes, to first make a globe or reflector of absolutely transparent glass, and on the outside reflecting or refracting prisms calculated to reflect or refract light in useful directions. I then coat the inner surface of such reflectors with a translucent but not transparent medium. Such a translucent but not transparent coating can be applied as a film on the inside and burned in, or may be applied by blowing an opalescent or opal surface on the inside of the prism glass globe, or it may be frosted by sand blasting, or acid-etching the inner surfaces, or any other of the current ways of rendering transparent glass translucent. The result of a globe or reflector made by my present method is that the rays of a light within such a globe or reflector pass through a translucent but not transparent surface, or medium, by which they are diffused. They then pass through the transparent body of the glass, and striking the directing prisms on the outside are distributed in useful directions in a softened form of light.

There are several advantages to my present method of making globes and reflectors. For instance, take a hemispherical globe (see Fig. 1). If this globe has outside horizontal deflecting prisms, calculated in the ordinary way, by omitting the inside vertical diffusing prisms and covering the inside surface with a translucent but not transparent medium, I not only succeed in softening the rays of light that pass through, but I actually produce a globe which will give a stronger downward concentrated light than is given with a globe using inside vertical diffusing prisms.

In Fig. 1 *a* represents a shade having external distributing prisms *b*, and an internal film or translucent surface *c*, of the character above described. The coating *c* is omitted from part of the shade, thus permitting light to pass without diffusion.

In Fig. 5, curve A represents a hemisphere composed entirely of transparent glass having inside vertical diffusing prisms. Curve B is of exactly the same external prisms, when used with a smooth interior surface covered with a diffusing translucent but not transparent medium. Not only an increased downward light is obtained, but a more soft light, and such a globe is easier to be kept clean.

In Figs. 2 and 4 the light passes through the interior translucent film or surface $c$ with which the interior of reflector $a'$ is provided, and thence passes to the reflecting surfaces of prisms $b'$, by which prisms the light rays are returned to the interior of the reflector, in the usual manner with reflecting prisms, but with the difference that the rays are broken up or softened, both in passing out and returning through film $c$.

As I stated above, all prism globes and reflectors to date have been made of transparent glass with one exception. This exception is the Zalinski reflector, made under Patent No. 775,741, November 22, 1904. In this patent the claims are made, that by coating the outside surface of a prismatic reflector, an increased reflecting power can be obtained.

The reflecting power of prisms is held by experts to be due wholly to the difference in density or refractive power of the medium in immediate contact with the prism, the reflection taking place at the surface of this medium. Thus in the ordinary prismatic reflector the rays are reflected from the surface of the air in molecular contact with the glass. If a medium of approximately the same refractive power as glass be brought into molecular contact with the glass, no reflection will take place. This principle is well known among opticians. In the process of enameling a prismatic reflector, a white or whitish powder is mingled with a transparent liquid and applied to the surface of the glass, the liquid being afterward hardened in the same manner. As such liquid makes optical contact with the glass, it prevents reflection taking place at the surface of contact, and therefore any reflection that takes place is from the surface of the white powder incorporated in the liquid. It results, therefore, that reflectors so constructed have only the reflecting power due to white surfaces, and not the combined reflecting powers of prisms and white surfaces. In my invention the reflecting prisms are left untouched, the diffusing medium being applied to the opposite surface.

What I claim is:

1. A transparent glass structure having light-directing prisms upon one side and a translucent light diffusing medium upon the opposite side.

2. A transparent glass structure having light directing prisms upon its exterior and a translucent light diffusing medium upon its interior.

3. A transparent glass structure having light reflecting prisms upon one side and a translucent light diffusing medium upon the opposite side.

4. A transparent glass structure having light directing prisms upon one side and a smooth translucent light diffusing medium upon the opposite side.

5. A transparent glass light inclosure having light directing prisms upon its exterior and a translucent light diffusing medium upon its interior.

6. A transparent glass light inclosure, having light reflecting prisms upon its exterior and a translucent light diffusing medium upon its interior.

7. A transparent glass light inclosure having light reflecting prisms upon its exterior and a smooth translucent light diffusing medium upon its interior.

8. A glass inclosure having upon a portion of its exterior, light directing prisms and upon a portion of its interior a translucent light diffusing medium, and having a portion free from light modifying media.

In testimony whereof I affix my signature in presence of two witnesses.

OTIS A. MYGATT.

Witnesses:
H. E. NASON,
ROBERT KELLY, Jr.